United States Patent
Deligne et al.

(10) Patent No.: US 9,754,586 B2
(45) Date of Patent: Sep. 5, 2017

(54) METHODS AND APPARATUS FOR USE IN SPEECH RECOGNITION SYSTEMS FOR IDENTIFYING UNKNOWN WORDS AND FOR ADDING PREVIOUSLY UNKNOWN WORDS TO VOCABULARIES AND GRAMMARS OF SPEECH RECOGNITION SYSTEMS

(75) Inventors: Sabine Deligne, Strasbourg (FR); Ramesh A. Gopinath, Millwood, NY (US); Dimitri Kanevsky, Ossining, NY (US); Mahesh Viswanathan, Yorktown Heights, NY (US)

(73) Assignee: Nuance Communications, Inc., Burlington, MA (US)

( * ) Notice: Subject to any disclaimer, the term of this patent is extended or adjusted under 35 U.S.C. 154(b) by 392 days.

(21) Appl. No.: 12/133,762

(22) Filed: Jun. 5, 2008

(65) Prior Publication Data

US 2008/0270136 A1 Oct. 30, 2008

Related U.S. Application Data

(63) Continuation of application No. 11/291,231, filed on Nov. 30, 2005, now abandoned.

(51) Int. Cl.
*G10L 15/19* (2013.01)
*G10L 15/06* (2013.01)
*G10L 15/183* (2013.01)

(52) U.S. Cl.
CPC ............ *G10L 15/19* (2013.01); *G10L 15/063* (2013.01); *G10L 15/183* (2013.01); *G10L 2015/0631* (2013.01)

(58) Field of Classification Search
CPC ..... G10L 15/063; G10L 15/193; G10L 15/22; G10L 2015/0631; G10L 15/19; G10L 15/197

(Continued)

(56) References Cited

U.S. PATENT DOCUMENTS 5,027,406 A * 6/1991 Roberts et al. ............... 704/244
5,233,681 A * 8/1993 Bahl et al. .................... 704/251

(Continued)

OTHER PUBLICATIONS

Genevieve Gorrell. Using Statistical Language Modelling to Identify New Vocabulary in a Grammar-Based Speech Recognition System. Sep. 1-4, 2003. 8th European Conference on Speech Communication and Technology.*

(Continued)

*Primary Examiner* — Matthew Baker
(74) *Attorney, Agent, or Firm* — Wolf, Greenfield & Sacks, P.C.

(57) ABSTRACT

The present invention concerns methods and apparatus for identifying and assigning meaning to words not recognized by a vocabulary or grammar of a speech recognition system. In an embodiment of the invention, the word may be in an acoustic vocabulary of the speech recognition system, but may be unrecognized by an embedded grammar of a language model of the speech recognition system. In another embodiment of the invention, the word may not be recognized by any vocabulary associated with the speech recognition system. In embodiments of the invention, at least one hypothesis is generated for an utterance not recognized by the speech recognition system. If the at least one hypothesis meets at least one predetermined criterion, a sword or more corresponding to the at least one hypothesis is added to the vocabulary of the speech recognition system. In other embodiments of the invention, before adding the word to the vocabulary of the speech recognition system, the at least one hypothesis may be presented to the user of the speech recognition system to determine if that is what the used intended when the user spoke.

16 Claims, 5 Drawing Sheets

(58) Field of Classification Search
USPC .................................. 704/1–10, 231–257
See application file for complete search history.

(56) References Cited

U.S. PATENT DOCUMENTS

| | | | | |
|---|---|---|---|---|
| 6,064,959 | A * | 5/2000 | Young et al. | 704/251 |
| 6,125,345 | A * | 9/2000 | Modi et al. | 704/240 |
| 6,154,722 | A * | 11/2000 | Bellegarda | 704/257 |
| 6,167,377 | A * | 12/2000 | Gillick et al. | 704/240 |
| 6,219,640 | B1 | 4/2001 | Basu et al. | |
| 6,233,553 | B1 * | 5/2001 | Contolini et al. | 704/220 |
| 6,298,324 | B1 * | 10/2001 | Zuberec et al. | 704/251 |
| 6,311,157 | B1 * | 10/2001 | Strong | 704/255 |
| 6,311,159 | B1 * | 10/2001 | Van Tichelen et al. | 704/275 |
| 6,421,641 | B1 * | 7/2002 | Huang et al. | 704/250 |
| 6,473,734 | B1 * | 10/2002 | Dvorak | 704/235 |
| 6,542,866 | B1 * | 4/2003 | Jiang et al. | 704/255 |
| 6,606,598 | B1 * | 8/2003 | Holthouse et al. | 704/275 |
| 6,694,296 | B1 * | 2/2004 | Alleva et al. | 704/255 |
| 6,816,836 | B2 | 11/2004 | Basu et al. | |
| 6,839,669 | B1 * | 1/2005 | Gould et al. | 704/246 |
| 6,937,702 | B1 | 8/2005 | Vacek et al. | |
| 6,941,264 | B2 | 9/2005 | Konopka et al. | |
| 6,973,427 | B2 * | 12/2005 | Hwang et al. | 704/249 |
| 7,089,188 | B2 * | 8/2006 | Logan et al. | 704/270 |
| 7,103,542 | B2 * | 9/2006 | Doyle | 704/231 |
| 7,120,582 | B1 * | 10/2006 | Young et al. | 704/255 |
| 7,167,831 | B2 * | 1/2007 | Falcon et al. | 704/275 |
| 7,200,555 | B1 * | 4/2007 | Ballard et al. | 704/235 |
| 7,286,985 | B2 * | 10/2007 | Chiu | 704/260 |
| 7,343,289 | B2 * | 3/2008 | Cutler et al. | 704/259 |
| 7,444,286 | B2 * | 10/2008 | Roth et al. | 704/270 |
| 7,447,635 | B1 * | 11/2008 | Konopka et al. | 704/275 |
| 7,542,904 | B2 * | 6/2009 | Chestnut et al. | 704/257 |
| 7,587,318 | B2 * | 9/2009 | Seshadri | 704/231 |
| 7,590,533 | B2 * | 9/2009 | Hwang | 704/231 |
| 7,603,279 | B2 * | 10/2009 | Washio | 704/277 |
| 7,620,549 | B2 * | 11/2009 | Di Cristo et al. | 704/257 |
| 7,634,409 | B2 * | 12/2009 | Kennewick et al. | 704/257 |
| 7,640,160 | B2 * | 12/2009 | Di Cristo et al. | 704/257 |
| 7,668,710 | B2 * | 2/2010 | Doyle | 704/9 |
| 7,668,718 | B2 * | 2/2010 | Kahn et al. | 704/270 |
| 7,680,659 | B2 * | 3/2010 | Gao et al. | 704/236 |
| 7,689,420 | B2 * | 3/2010 | Paek et al. | 704/257 |
| 7,720,683 | B1 * | 5/2010 | Vermeulen et al. | 704/254 |
| 7,983,917 | B2 * | 7/2011 | Kennewick et al. | 704/257 |
| 8,069,046 | B2 * | 11/2011 | Kennewick et al. | 704/257 |
| 2001/0018654 | A1 * | 8/2001 | Hon et al. | 704/257 |
| 2002/0010714 | A1 * | 1/2002 | Hetherington | 707/505 |
| 2002/0082829 | A1 * | 6/2002 | Jiang et al. | 704/226 |
| 2002/0082831 | A1 * | 6/2002 | Hwang et al. | 704/249 |
| 2002/0111803 | A1 * | 8/2002 | Romero | 704/231 |
| 2002/0128836 | A1 * | 9/2002 | Konuma et al. | 704/251 |
| 2002/0156776 | A1 * | 10/2002 | Davallou | 707/3 |
| 2002/0173958 | A1 * | 11/2002 | Asano et al. | 704/251 |
| 2003/0120493 | A1 * | 6/2003 | Gupta | 704/270.1 |
| 2003/0171929 | A1 * | 9/2003 | Falcon et al. | 704/275 |
| 2003/0195739 | A1 * | 10/2003 | Washio | 704/1 |
| 2003/0220791 | A1 * | 11/2003 | Toyama | 704/256 |
| 2004/0148164 | A1 * | 7/2004 | Baker | 704/231 |
| 2004/0179659 | A1 * | 9/2004 | Byrne et al. | 379/88.18 |
| 2005/0038650 | A1 * | 2/2005 | Bellegarda et al. | 704/231 |
| 2005/0091036 | A1 * | 4/2005 | Shackleton et al. | 704/9 |
| 2005/0187769 | A1 * | 8/2005 | Hwang et al. | 704/240 |
| 2005/0256712 | A1 * | 11/2005 | Yamada | G10L 15/08 704/255 |
| 2006/0287866 | A1 * | 12/2006 | Cross et al. | 704/275 |
| 2006/0293886 | A1 * | 12/2006 | Odell et al. | 704/231 |
| 2007/0005206 | A1 * | 1/2007 | Zhang et al. | 701/36 |
| 2007/0038436 | A1 * | 2/2007 | Cristo | G06F 17/273 704/9 |
| 2007/0213978 | A1 * | 9/2007 | Schroer et al. | 704/231 |
| 2008/0114595 | A1 * | 5/2008 | Vair et al. | 704/236 |

OTHER PUBLICATIONS

Balakrishna, M.; Moldovan, D.; Cave, E.K.; , "Automatic creation and tuning of context free grammars for interactive voice response systems," Natural Language Processing and Knowledge Engineering, 2005. IEEE NLP-KE '05. Proceedings of 2005 IEEE International Conference on , vol., No., pp. 158-163, Oct. 30-Nov. 1, 2005 doi: 10.1109/NLPKE.2005.159872.*

Deligne, S., et al., "Statistical Language Modeling with a Class based n-Multigram Model", Jul. 2000, Computer Speech and Language, vol. 14, No. 3, 46 pgs.

* cited by examiner

METHODS AND APPARATUS FOR USE IN SPEECH RECOGNITION SYSTEMS FOR IDENTIFYING UNKNOWN WORDS AND FOR ADDING PREVIOUSLY UNKNOWN WORDS TO VOCABULARIES AND GRAMMARS OF SPEECH RECOGNITION SYSTEMS

CROSS REFERENCE TO RELATED APPLICATION

This application is a continuation of copending U.S. patent application Ser. No. 11/291,231 filed Nov. 30, 2005 now abandoned.

TECHNICAL FIELD

The invention concerns methods and apparatus for use in speech recognition systems and more particularly concerns methods and apparatus for identifying and assigning meaning to new words and utterances. The new words and utterances may be known beforehand, but used in a new way unknown to an embedded grammar of a language model incorporated in a speech recognition system, or may be totally unknown beforehand from any perspective to a speech recognition system.

BACKGROUND

Speech recognition systems are finding increasing use, particularly in voice-controlled user interfaces. Voice-controlled user interfaces are familiar to anyone who performs banking and credit card transactions by telephone. In the past, telephonic banking and credit card service transactions were performed either through interaction with a human agent or by using a keypad of a telephone; now, with increasing frequency telephonic banking and credit card service transactions may be performed using voice commands.

Voice-activated user interfaces are also finding increasing use in portable electronic devices like cellular telephones and personal digital assistants ("PDAs") with telephonic capabilities. For example, in cellular telephones with voice-activated user interface capability, a user can enter a voice command "Call Bob Smith" in order to initiate a telephone call to a target person ("Bob Smith"). This eliminates the need for the user to enter a telephone number, or to access a contact list containing the telephone number, thereby saving keystrokes. The elimination of keystrokes often enables hands-free modes of operation, which is particularly advantageous when the telephone call is initiated by someone operating an automobile. There is increasing pressure to restrict the operation of cellular telephones by drivers of automobiles, particularly cellular telephones that require hand operation.

Thus, the ability to initiate an operation (e.g., a telephone call) by issuing a voice command to a voice-controlled user interface is particularly advantageous because it saves time and effort previously expended by entering commands using keys or other hand-operated input devices. This advantage ends, though, as soon as a user enters a command not recognized by a speech recognition system associated with a voice-controlled user interface. In such circumstances, a user is often thrust back to old, more tedious modes of operation where a command has to be entered using a combination of keystrokes.

In such situations, where a cellular telephone user is seeking to initiate a telephone call, the user would either have to enter the telephone number directly, or add it to a contact list. Since users of productivity-enhancement devices like cellular telephones and PDAs value the ability of these devices to "grow" with the user by, for example, being able to record and save an extensive and ever-expanding contact list, the fact that this ability may only be partially implemented (if at all) through voice commands is viewed as a particular limitation of voice-activated user interface systems incorporated in such devices. If a user has an extensive contact list, the user might not even initiate a telephone call using the voice command feature, because the user might forget whether the person to be called is even in the contact list and thus capable of being recognized by a voice-activated user interface operating in combination with the contact list.

A further problem is apparent in this description of the prior art. In conventional speech recognition systems, the vocabularies and grammars are fixed. Accordingly, when the user is thrust back upon a keystroke-mode of operation in order to enter new commands, the user will have to enter the new commands with keystrokes every time the new commands are to be performed, since the vocabularies and grammars are fixed. There is no benefit to the speech recognition system associated with the user giving meaning to a command unrecognized by the speech recognition system using keystrokes, since the information entered using keystrokes does not modify the capabilities of the speech recognition system.

Accordingly, those skilled in the art desire speech recognition systems with the ability to "grow." In particular, those skilled in the art desire speech recognition systems with the ability to identify new words previously unknown to the speech recognition system and to add them to one or more vocabularies and grammars associated with the speech recognition system. In addition, those skilled in the art desire voice activated user interfaces with the ability to learn new commands. Further, when it is necessary to enter commands using keystrokes, those skilled in the art seek speech recognition systems that can be re-programmed though interaction with keys, keyboards, and other command entry controls of an electronic device, so that the speech recognition system benefits from the efforts expended in such activities.

SUMMARY OF THE PREFERRED EMBODIMENTS

The foregoing and other problems are overcome, and other advantages are realized, in accordance with the following embodiments of the present invention.

A first embodiment of the present invention comprises a signal-bearing medium tangibly embodying a program of machine-readable instructions executable by a digital processing apparatus of a computer system to perform speech recognition operations, the speech recognition operations comprising: detecting at least a target word known to an acoustic vocabulary but unknown to an embedded grammar of a language model of the speech recognition system; assigning a language model probability to the target word; calculating a sum of an acoustic and language model confidence score for the target word and words already included in the embedded grammar of the language model; and if the sum of the acoustic and language model probability for the target word is greater than the sum of the acoustic and language model probability for the words already included in the embedded grammar, adding the target word to the language model.

A second embodiment of the present invention comprises a signal-bearing medium tangibly embodying a program of machine-readable instructions executable by a digital processing apparatus of a computer system to perform speech recognition operations, the speech recognition operations comprising: detecting an utterance having a low acoustic score within an acoustic vocabulary of the speech recognition system indicating that the utterance may correspond to an out-of-vocabulary word; generating at least one new word hypothesis comprised of at least one of a phone- or syllable sequence using confidence scores derived from probabilities contained in a database of viable phone and syllable sequences; and if the at least one new word hypothesis meets a pre-determined criterion, adding a word corresponding to the at least one new word hypothesis to the vocabulary of the speech recognition system.

A third embodiment of the present invention comprises a signal-bearing medium tangibly embodying a program of machine-readable instructions executable by a digital processing apparatus of a computer system to perform speech recognition operations in a speech recognition system, the speech recognition operations comprising: detecting an utterance not recognized by at least a first one of an acoustic vocabulary, embedded grammar, and viable phone/syllable sequence library of the speech recognition system; generating at least one hypothesis for the utterance, wherein the hypothesis is based on information derived from a second one of an acoustic vocabulary, embedded grammar and viable phone/syllable sequence library of the speech recognition system; calculating a confidence score for the at least one hypothesis and for members of the first one of the acoustic vocabulary, embedded grammar and viable phone/syllable sequence library of the speech recognition system; comparing the confidence scores calculated for the at least one hypothesis and for members of the first one of the acoustic vocabulary, embedded grammar and viable phone/syllable sequence library of the speech recognition system; and adding information to the first one of an acoustic vocabulary, embedded grammar and viable phone/syllable sequence corresponding to the hypothesis if a pre-determined criterion based on the comparison is met.

A fourth embodiment of the present invention comprises a speech recognition system comprising: a speech input for receiving speech from a user of the speech recognition system; an open set comprised of at least one open vocabulary and at least one open embedded grammar associated with a language model implemented in the speech recognition system; a hierarchical mapping system for identifying utterances not recognized by at least one of the open vocabulary and open embedded grammar of the speech recognition system; for generating hypotheses for the unrecognized utterances using confidence scores based at least in part on one of viable phone/syllable sequence information, acoustic vocabulary information and grammar information; and for adding information corresponding to the hypotheses to at least one of the open vocabulary and embedded grammar of the speech recognition system if a pre-determined criterion is met; and a confidence score system for generating confidence scores for use by the hierarchical mapping system.

In conclusion, the foregoing summary of the alternate embodiments of the present invention is exemplary and non-limiting. For example, one of ordinary skill in the art will understand that one or more aspects or steps from one alternate embodiment can be combined with one or more aspects or steps from another alternate embodiment to create a new embodiment within the scope of the present invention.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
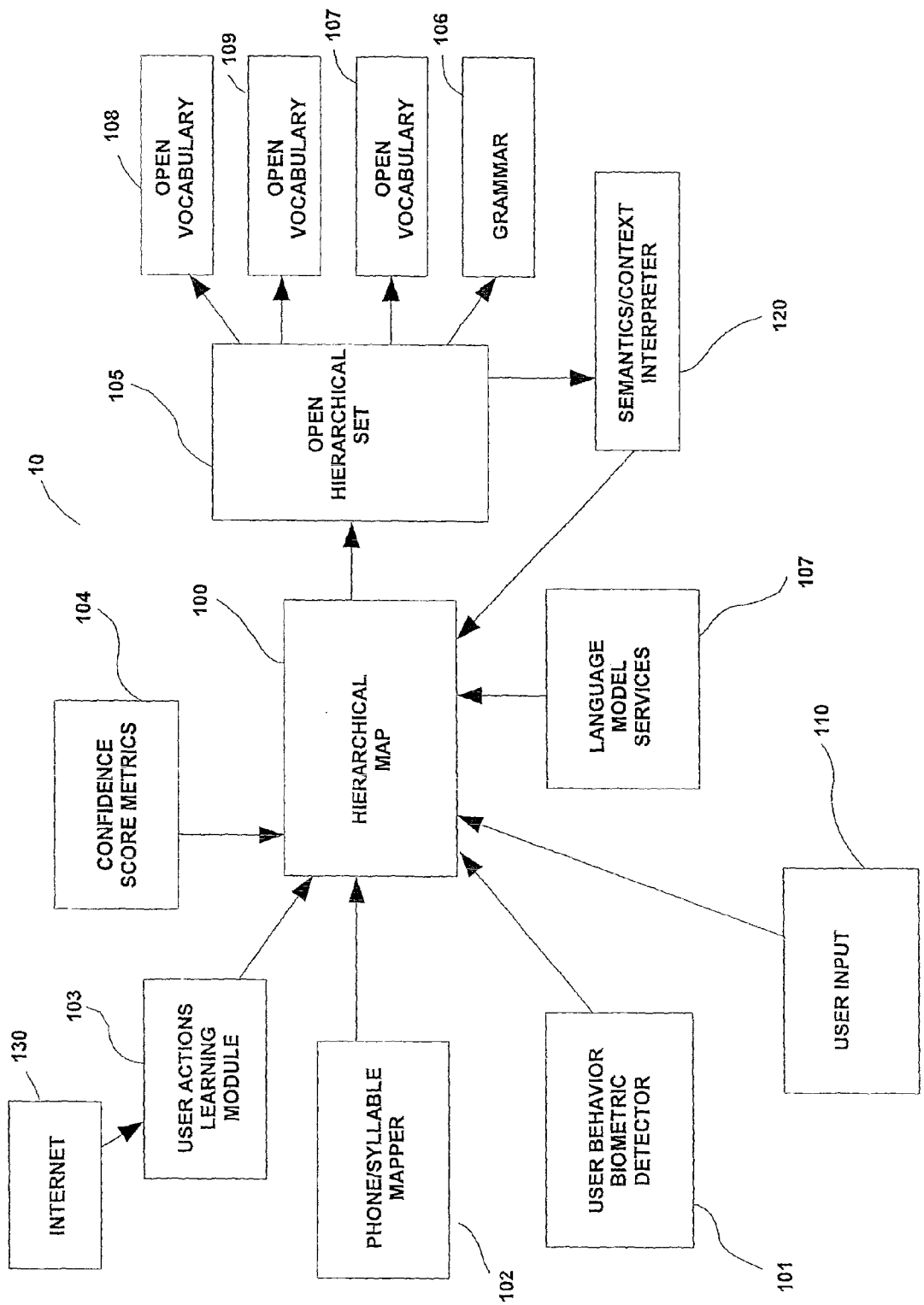
FIG. 1 is a block diagram depicting a system embodying several aspects of the present invention.

As introduction, an aspect of the present invention will be described to illustrate problems encountered in the prior art and how the present invention solves them. Embodiments of the present invention are generally operative in automated, electronic speech recognition systems that are used in electronic devices with speech input capability such as, for example, telephones. The speech recognition systems typically operate in such electronic devices as part of a voice-activated user interface. Before the electronic device can take action in response to a user command, the speech recognition system has to parse the speech utterance comprising the command and assign meaning to the speech utterance. In prior art devices, users are required to operate within relatively narrow categories of vocabulary and grammar when interacting with a speech recognition system, because conventional speech recognition systems are fixed in capability. The speech recognition systems of the prior art have fixed vocabularies and grammars, meaning that if a speech utterance is not in a speech recognition system's vocabulary and grammar, no action or possibly even an incorrect action will be taken by the voice-activated user interface. This occurs because the speech utterance is unknown to the speech recognition system associated with the voice activated user interface.

Accordingly, an aspect of the present invention provides a speech recognition system with open vocabularies and grammars, allowing the speech recognition system to be programmed with new words and grammatical constructs (such as, for example, commands) through interaction with a user. As a result of these interactions, a voice-activated user interface with which the speech recognition system is associated can be programmed to perform new actions. To illustrate the operation of an aspect of the invention an example will be provided. Assume a user is interacting with a voice-activated user interface that is incorporated in a telephone, and speaks a command "Call Morita-san". "Morita" is a Japanese surname, and "Morita-san" is a way one named "Morita" may be addressed in Japanese. The speech recognition system is programmed to recognize the command "Call _", and also is programmed to recognize certain names and telephone numbers that are used in combination with the "Call _" command. However, in this particular example, the speech recognition system is initially not programmed to recognize the name "Morita-san", nor has the user heretofore uttered the words "Morita-san" in combination with the command "Call _". Accordingly, in one aspect of the present invention the speech recognition system generates a phonetic sequence hypothesis for "Morita-San" having a high degree of probability; presents the hypothesis to the user for confirmation, including spelling; and after receiving confirmation (and possibly even a spelling correction) adds the word "Morita-San" to an embedded grammar associated with the "Call _" command. In various embodiments of the invention, additional steps may be performed. For example, the user may associate a specific telephone number with the word "Morita-san" as it is being added to the embedded grammar of the speech recognition system. Once "Morita-san" has been added to the embedded grammar and the telephone number has been associated with the new word "Morita-san", the next time the speech recognition system hears the command "Call Morita-san" it will automatically call the telephone number associated with "Morita-san".

In variants of this embodiment, confidence scores may be assigned using additional information besides, for example, phonetic or grammar information. Higher-level models based on semantic and context information may be used in combination with phonetic and grammar information to identify unknown words using confidence scores. For example, regarding context, the speech recognition system may take into consideration what actions the user of the speech recognition system had been performing prior to speaking the unrecognized word. These actions provide context information which may assist the speech recognition system in assigning meaning to the unrecognized word.

In another embodiment of the invention, the speech recognition system would automatically poll the user of the speech recognition system to enter by keystrokes the information associated with the unrecognized command. Assume the user spoke the same sequence as in the preceding example, "Call Morita-san", and the system did not recognize either the grammatical construct "Call _" or the name "Morita-san". In this embodiment of the invention, the voice-recognition system would ask the user to illustrate the command by keystrokes and provide the name by keystrokes. Accordingly, after entry of the illustrative example, the speech recognition system would then recognize that the "Call _" construct corresponds to an instruction to perform a telephone call. In addition, after entry of the name "Morita-san" (and possibly an associated telephone number), the speech recognition system would recognize "Morita-san" as someone to be called at a specific telephone number.

Further embodiments of the present invention implement additional features that may be used in combination with the functionality associated with the foregoing aspects of the present invention. For example, often a user of a speech recognition system provides biometric cues identifying when the user is introducing a new word. The user may slow down her speech to emphasize a word, may speak more loudly to emphasize a word, or may pause to emphasize a word. These actions may be used alone or in combination with physical gestures to emphasize a word. Further embodiments of the present invention employ audio and visual biometric measuring systems to help identify when a user of a speech recognition system is speaking a new word.

Now further aspects of the present invention, and the problems they overcome, will be described in greater detail. There are two typical situations encountered in a speech recognition system with respect to new words. In a first situation, the speech recognition system recognizes a word as a valid phonetic sequence known to at least one acoustic vocabulary of the speech recognition system. However, the word is used in new way not recognized by an embedded grammar of a language model incorporated in the speech recognition system. "Embedded grammar" and "language model" are concepts and means for implementing a speech recognition system that generally refer to the fact that a speech recognition system recognizes and assigns meaning to not only words, but to combinations of words. In a voice-activated user interface incorporating a speech recognition system, "embedded grammar" and "language model" refer to the functionality of the speech recognition system that recognizes both responses to queries initiated by the voice-activated user interface, and to commands entered by a user of the voice-activated user interface. So in the first example, a word that is recognized as a valid phonetic sequence is nonetheless used in a such a way that the speech recognition system cannot assign meaning to the utterance incorporating the word, since the word is used in a new way. A typical example would be encountered when a word that is recognized by a voice-activated user interface as a valid phonetic sequence is used in a command, wherein the embedded grammar functionality which ordinarily detects the command is not programmed to recognize and assign meaning to the command when the command incorporates the new word. In one aspect of the present invention various methods and apparatus are provided that enable an embedded grammar of a speech recognition system to "grow" by adding new words to the embedded grammar.

In a more general situation, a sequence of sounds corresponding to one or more words spoken by a user of a speech recognition system may be unknown to any vocabulary or language model of the speech recognition system. In this aspect of the present invention, various methods and apparatus are provided that enable a speech recognition system to grow both by adding previously unknown words to one or more vocabularies of the speech recognition system, and by adding new grammatical constructs (such as, for example, new commands) to an embedded grammar of a language model incorporated in a speech recognition system.

Embodiments of the present invention responding to the first circumstance identified above—where a known word is used in a new, unrecognized context—are handled in the following manner. Generally, an embedded grammar incorporated in a language model of a speech recognition system operating in accordance with the invention is designed to expand by accommodating new uses for words recognized by other aspects of the speech recognition system (such as phonetic vocabularies).

A conventional embedded grammar operates as follows when a word included in the grammar is spoken:
Construct: {W1}{W2}
   Prepare list of acceptable Li's
     L1, L2, . . . are all list items—part of an embedded grammar
     L1, . . . Ln are all equi-probable (to a first degree of approximation)
     For example, Call <name>, where name may be a list of 50 proper names
     Phrase score for {W1} {W2} {Li}=Acoustic score (Li)+Language Model Score (Li|W1W2)

As is apparent, a particular word Li having the highest sum for acoustic score and language model score is deemed to be the most likely hypothesis for the word intended by a speaker. No accommodation is made in conventional methods for words unrecognized by the speech recognition system.

In contrast, in methods and apparatus of the present invention, embedded grammars and language models of a speech recognition can expand to incorporate words that are recognized by other aspects of the speech recognition system (such as, for example a phonetic vocabulary), but which are not recognized by a particular embedded grammar as a valid option. A method of the present invention operates in the following manner:

('U' (Word actually spoken) is not in an embedded grammar) Construct: {W1}{W2}
   "Create" an empty list item and assign it a non-zero probability, $P\{U\}<P\{Li\}$
   Word ('U') recognized by other aspects of speech recognition system but not by embedded grammar has a small probability allowing grammar room to expand
   For example, "Go to <city not in embedded grammar> $P\{U\}<P\{Li\}$, but Acoustic Score (U)+Language Model Score (U)>Acoustic Model Score (Li)+Language Model Score (Li)

In this method of the present invention, the sum of the acoustic and language model scores will favor the word recognized by other aspects of the speech recognition system (such as a phonetic vocabulary) but not by the embedded grammar over words that are recognized by the embedded grammar. This results from the fact that none of the words initially in the embedded grammar sound like the word actually spoken. Alternatively, the word not in the embedded grammar is recognized phonetically with a high degree of probability since the word is in at least one phonetic vocabulary of the speech recognition system. Accordingly, the speech recognition system concludes that the most likely hypothesis is that the speaker intended to use the new word in, for example, the command spoken, as opposed to any words recognized by the embedded grammar.

A method operating in accordance with this aspect of the present invention may be followed by additional steps. For example, the speech recognition system may synthesize a hypothesis corresponding to the utterance spoken by the speaker and play it to the speaker using the word not initially in the embedded grammar but incorporated in some other vocabulary or grammar of the speech recognition system. In such an instance the system would seek confirmation from the speaker that the word is what the speaker intended. As part of these additional steps, a baseform may be generated so that pronunciation can be confirmed.

In the other situation described above where an utterance is unrecognized by any vocabulary or grammar of a speech recognition system, the present invention operates on phone sequences to generate hypotheses for a word or combinations of words spoken by a user that are unrecognized by the speech recognition system. A speech recognition system operating in accordance with the present invention generates a hypothesis and assigns a confidence score to check if a hypothetical word corresponds to the spoken word with a high degree of probability. The speech recognition system can seek confirmation from a speaker to make sure the system reproduced the correct word. For example, if the speaker spoke the command "Call Moscow" and the word "Moscow" is not in any vocabulary or grammar of the speech recognition system, the speech recognition system would reproduce the sound sequence "moss cow" and compute a confidence score for the combination of syllables. This aspect of the present invention operates based on the assumption that it is possible to understand what a user spoke by identifying sequences of syllables. In order for the speech recognition system to implement this aspect of the present invention, the system incorporates a library that includes possible phones or syllables that might occur in a user's active vocabulary. In addition, the system includes decoding graphs indicating how individual phones or syllables can be combined.

In a typical implementation, this second aspect of the present invention would operate in combination with the first aspect. For example, in many instances, it would not be necessary for the system to operate with phone or syllable decoding enabled at all times, since the user would be speaking words that are recognized at least by phonetic vocabularies of the speech recognition system. However, when an utterance is encountered which is not recognized by any vocabulary or grammar of the speech recognition system, the phone/syllable decoder of the present invention would be enabled to assist in decoding of the utterance.

Various embodiments of the invention operate to improve the efficiency of a speech recognition system in identifying new words based on phonetic methods. For example, in one embodiment a database of viable phone/syllable sequences and associated combination probabilities is implemented to assist the speech recognition system in proposing word or utterance hypotheses with a high degree of confidence. The combination probabilities may reflect the likelihood of a two-phone or syllable sequence, a three-phone or syllable sequence, etc. The viable phone/syllable sequence database can be implemented in many ways in accordance with the present invention. For example, the viable phone/syllable sequence database can reflect phone/syllable sequences likely to be encountered in interactions with a particular user of a speech recognition system; phone/syllable sequences likely to be encountered with respect to a set of commands used in combination with a voice-activated user interface; phone/syllable sequences likely to be encountered in proper names and surnames; phone/syllable sequences likely to be encountered in a specific language; and phone/syllable sequences likely to be encountered in a subset of languages or all languages.

In further embodiments of the invention additional information—such as, for example speech and body movement biometric information—are used to identify new words. Apparatus associated with the speech recognition system detect changes in speech cadence which may be indicative of a new word. Additional apparatus associated with the speech recognition system analyze video data to detect gestures and body movements that may be indicative of introduction of a new word in the speech of a user of a speech recognition system.

FIG. 1 is a block diagram showing a plurality of systems that selectively may be incorporated in various embodiments of the present invention. The central system is an hierarchical mapping system 100 that receives inputs from a plurality of interconnected systems comprising the speech recognition system 10 of the present invention. The hierarchical mapping system 100 processes information received from other blocks and maps user input (such as, for example, a voice utterance) into a vocabulary subset in a hierarchical open set 105 of vocabularies. In an example, the hierarchical mapping process 100 can decode an acoustic utterance "China" into a word "China" that may belong to one of the system vocabularies but which is not recognized by a grammar set associated with a context in which the word "China" appeared. In the speech recognition system of the present invention, the hierarchical mapping process 100 adds "China" to the grammar set associated with the context in which the word "China" appeared and interprets the utterance in accordance (via semantic/context interpreter 120) with the context otherwise indicated by the utterance. A particular advantage of the present invention results from the fact that open hierarchical set 105 is comprised of open subsets (grammars and vocabularies)—as a result, these subsets are dynamic and can be updated with new words and grammatic constructs in various embodiments of the present invention. Learning module 103 is operable to learn user behavior associated with user requests (using internet facilities to learn across a plurality of users) and associate commands to user requests. In one example, a previously unrecognized command like "Call China" would be associated with an action to call a specific telephone number after the speech recognition system learns the word "China" and through interaction with a user learns to associate the command "Call China" with the action to call a specific telephone number.

Confidence score metrics system 104 resolves conflicts between different words and their membership in different subsets in the hierarchy. For example, referring back to the "Call China" example, there may be a word incorporated in a grammar which has a higher language model score than "China" but which has a lower acoustic score than "China". The confidence score metrics system 104 operates in such a way to resolve these conflicts. In various embodiments of the invention, confidence scores can be assigned for acoustic models, language models and for semantic models. In embodiments of the present invention an acoustic score is assigned for a sequence of phones or syllables via phone/syllable mapper 102. The acoustic representation determined with a high degree of confidence from this scoring process may not correspond to any existing word in a set of vocabularies 106, 107, 108 or 109. In such a situation, if the confidence score block 104 evaluates the confidence metric for a new phone/syllable sequence as nigher than the score for competitive words—the new sequence of phones/syllables will be considered as a new word that should be added to an open vocabulary (e.g., to 109). A meaning for the new word/phrase is received through one or both of user actions learning module 103 and semantics/context interpreter block 120. New commands are also added to a grammar 106 in embodiments of the present invention. Language model services block 107 provides language data for sequences: phones, syllables, words and phrases. This data can be used by the confidence score block 104 to derive confidence scores. This language data also can be used to compute language model scores in a decoding process operating within the hierarchical mapping system 100. User behavior biometric detector 101 provides biometrics data about user behavior (e.g., conversational biometrics) that helps to identify whether the acoustic utterance points to a new word (e.g., hesitation on some phrases, pauses, speaking stress etc.).

Figure 2:
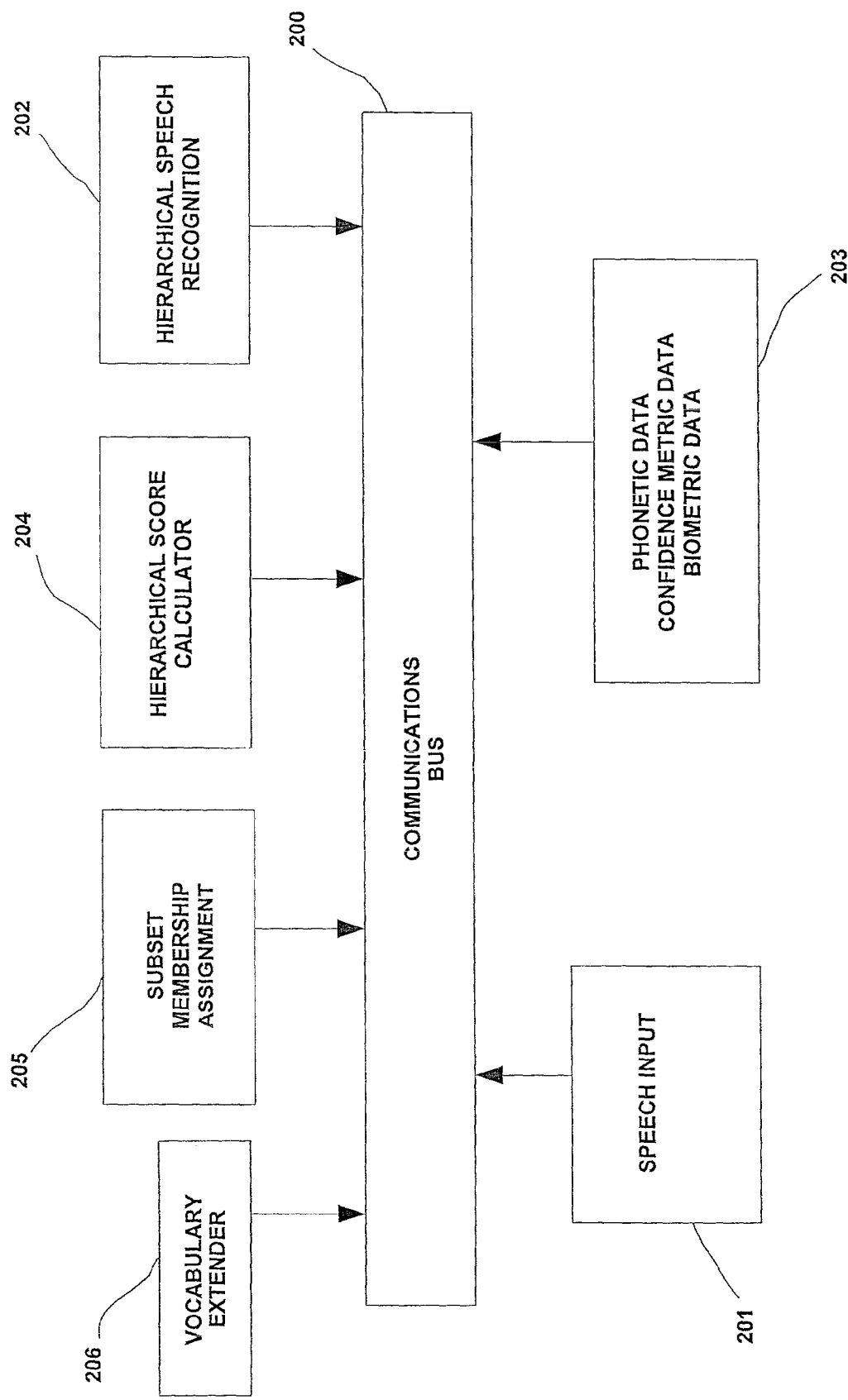
FIG. 2 is a block diagram depicting in greater detail the hierarchical mapping system of FIG. 1.

FIG. 2 is a block diagram depicting in greater detail the hierarchical mapping system 100 of FIG. 1. The hierarchical mapping system 100 contains a communications bus 200 through which different system modules exchange data. Data that enters hierarchical map system 100 (through bus 200) comprises data produced by modules previously described with respect to FIG. 1 and which are connected to 100 (e.g., speech input from 110, phonetic data in 203 from 102, confidence data in 203 from 104, biometrics data in 203 from 101 etc.).

Speech input 201 is directed to the hierarchical speech recognition system 202. This speech system operates to provide hierarchical decoding of, for example, phones, syllables, words and phrases. Hierarchical speech recognition system 202 also produces data for computation of hierarchical scores in 204.

Hierarchical score calculator 204 also uses conventional biometrics information from user biometric detector 101. For example, if the user hesitates on some acoustic utterance—a score is added to the confidence score for acoustic information (for example as linear weighted sum). For example, duration of hesitation or stress value of sounds may be normalized and added as a weighted sum. Similarly other scores (semantic, language models etc) are added as a weighted sum in more complex implementations. The confidence score is computed either for separate words, for phonetic/syllable sequences, or for membership in some subset (a grammar, vocabulary etc.) in 205. If a novel sequence of phones/syllables/phrases is chosen (via the highest confidence score) it is added by the vocabulary extender 206 to the appropriate subset.

Figure 3:
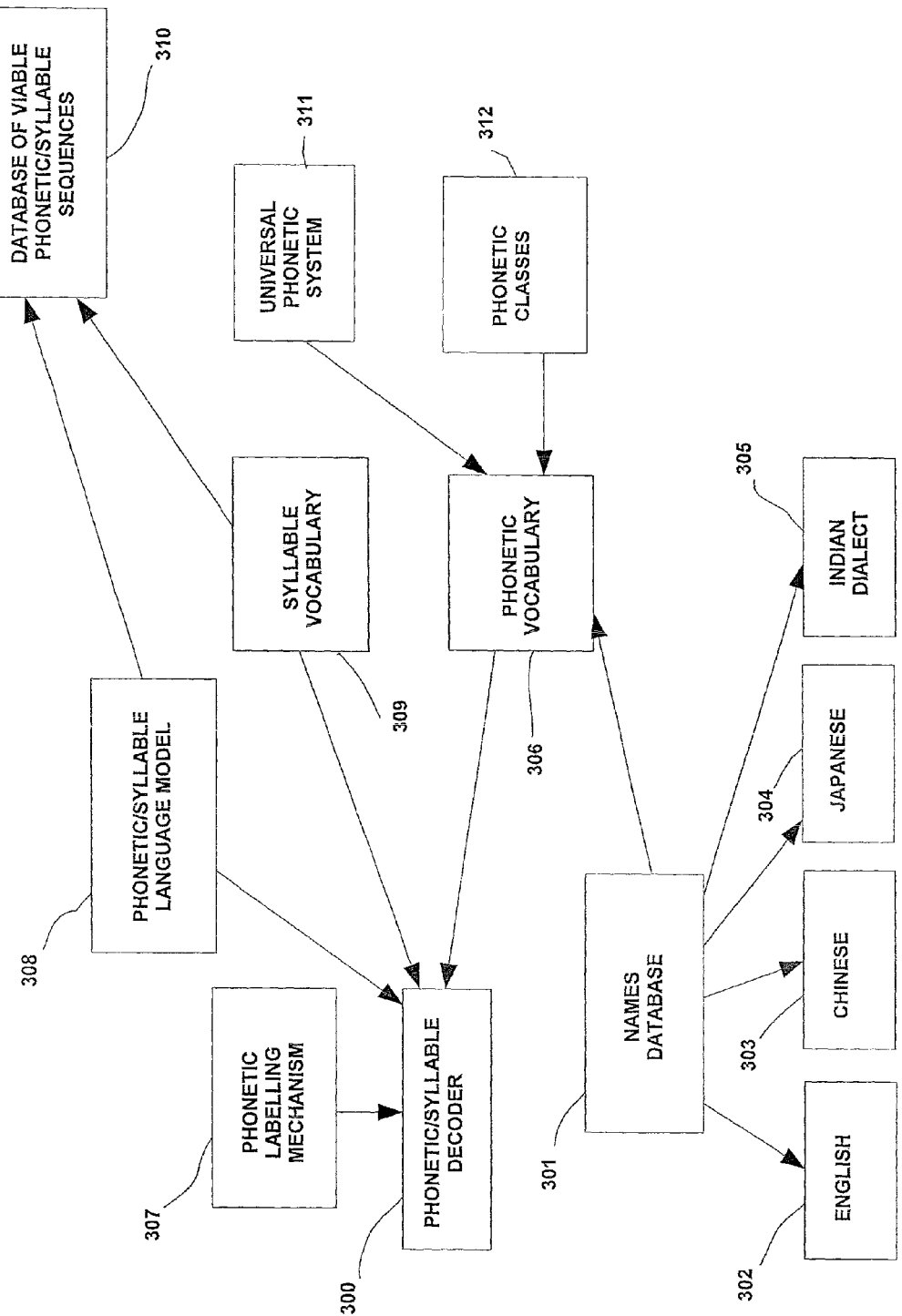
FIG. 3 is a block diagram depicting a phone/syllable mapper made in accordance with the present invention.

FIG. 3 depicts a phone/syllable mapper 102 capable of operating in accordance with the present invention. Phonetic decoder 300 is a phonetic/syllable decoder that can be used in an hierarchical speech recognition system 202 that decodes phonetically. The phone/syllable decoder 300 uses phone 306 and syllable vocabularies 309 and phone/syllable language models 308 for decoding. Phone 306 and syllable vocabularies 309 are created from a database of names 301 (which can include names in different languages—English 302; Chinese 303; Japanese 304; Indian dialects 305). Other databases for other categories include phone classes 312 and a universal phonetic system 311 (that are applicable to several or all languages). Language models 308 and phone/syllable vocabularies 306, 309 are used to create viable phonetic/syllable sequences 310, which are derived from viable language models stored in a database or which are created dynamically. These viable sequences are not words in some vocabulary, but have a good chance to become legitimate words to be added to open vocabularies.

Figure 4:
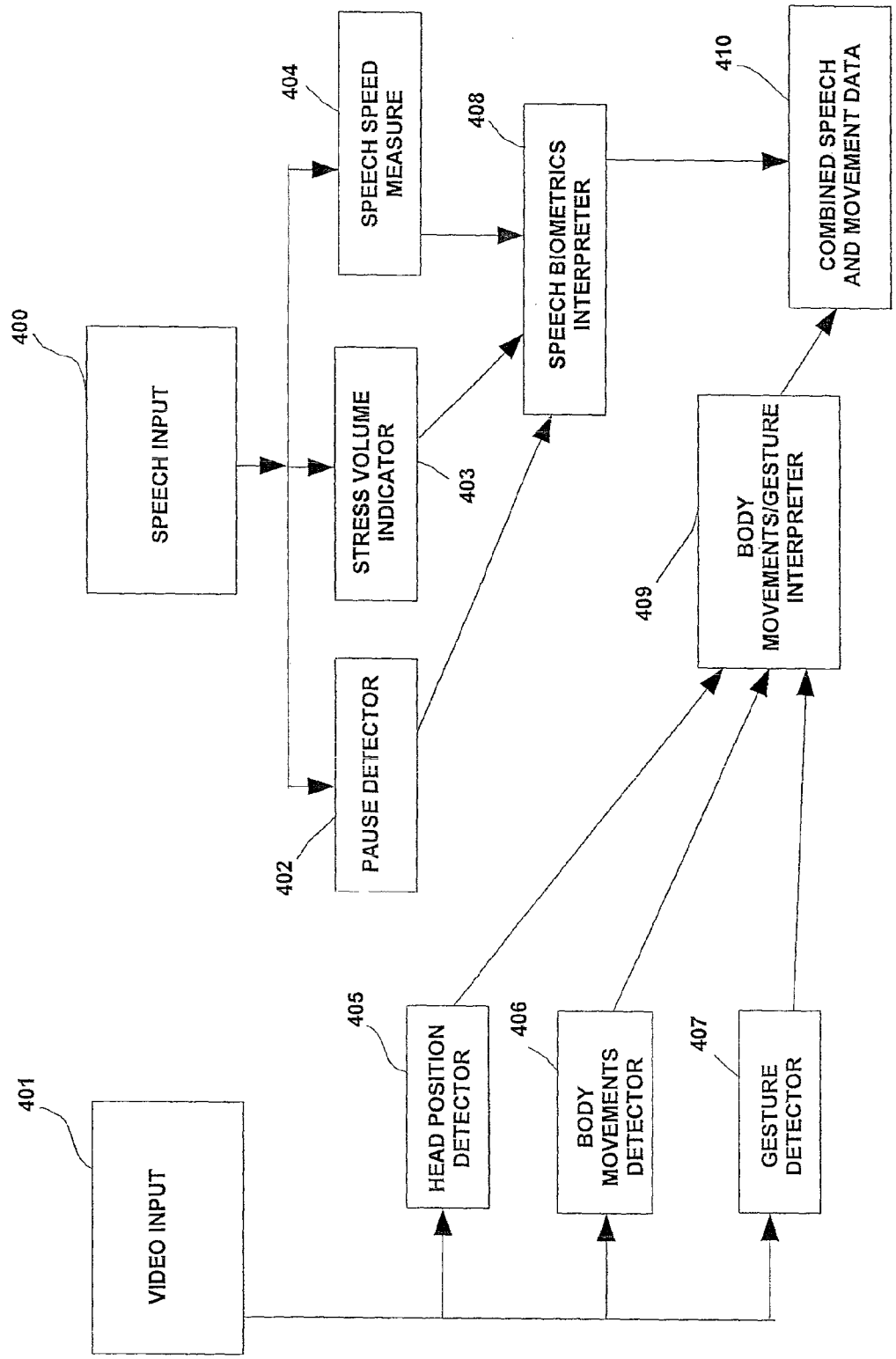
FIG. 4 is a block diagram depicting a user behavioral biometrics detector made in accordance with the present invention.

FIG. 4 depicts a user behavioral biometrics detector 101. User behavioral biometrics detector 101 comprises a speech input 400 and a video input 401. Pause detector 402 operates to detect pauses in speech; stress volume indicator 403 operates to detect stresses during speech; and speech speed measure detector 404 operates to detect changes in speech speed. Speech biometrics interpreter 408 combines information derived from the speech data by 402, 403 and 404.

Figure 5:
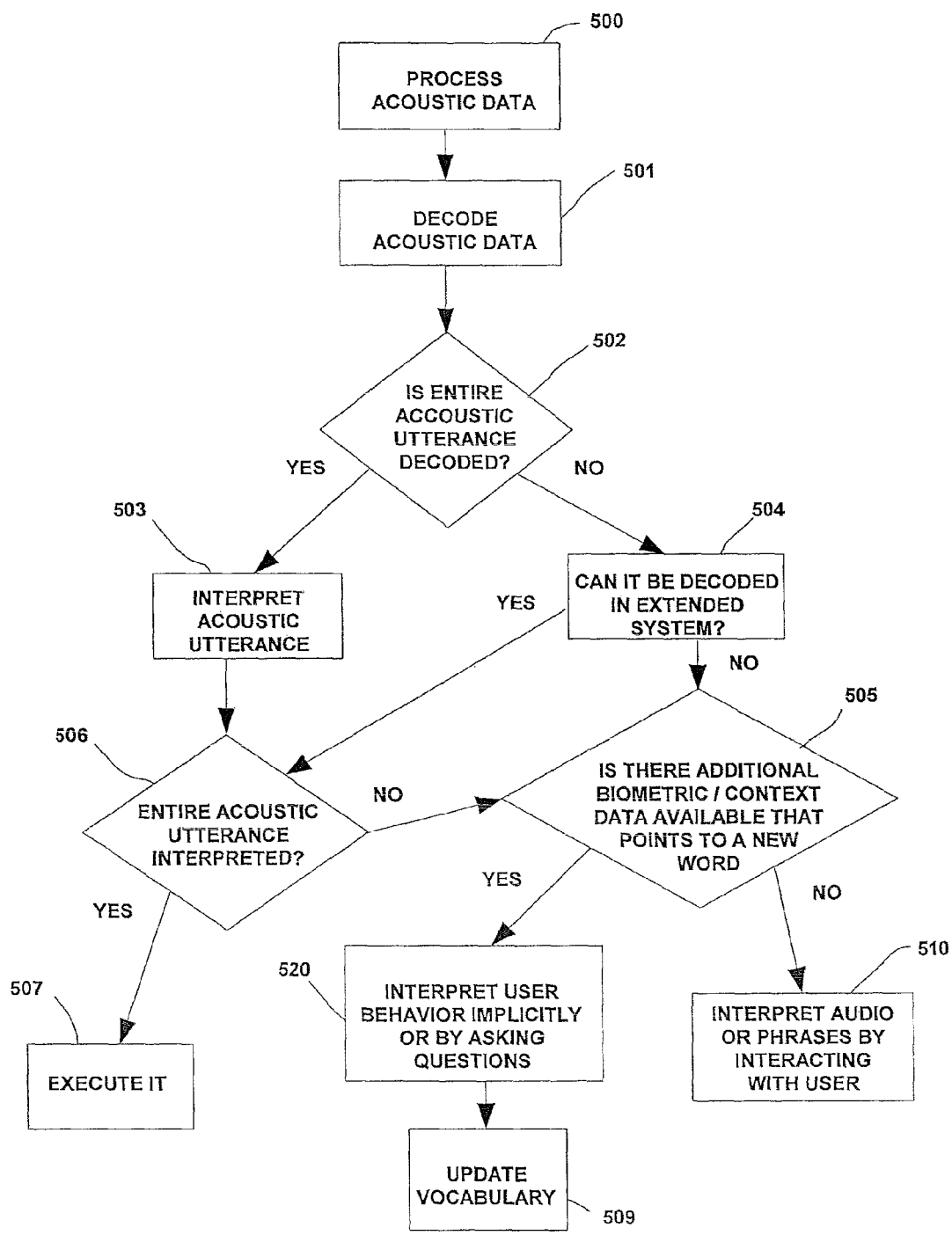
FIG. 5 is a flow chart depicting a method operating in accordance with the present invention.

Video data received at input 401 is operated on by head position detector 405, body movement detector 406, and gesture detector 407. Head position detector 405 that helps to identify whether a user requested some actions from a system by looking at a device—for example, by looking at a window in a car and asking to open the window. Information derived by 405, 406 and 407 are combined by body movements/gesture interpreter 409 to provide a complete biometrics picture based on user movement FIG. 5 is a flow chart depicting a method of the present invention. At step 500, a speech recognition system capable of practicing the methods of the present invention receives an utterance and process the utterance. Then, at step 501, the speech recognition system decodes the acoustic data. Step 502 is a decision point where the speech recognition system decides whether the entire acoustic utterance has been decoded. If it has, then at step 503 the speech recognition system interprets the acoustic data. At step 506, the speech recognition system reaches another decision point. At step 506, the speech recognition system decides whether the entire utterance has been interpreted. If so, at step 507, a command contained in the utterance is executed.

Returning to step 502, if the entire acoustic utterance cannot be decoded, the speech recognition system decides whether the utterance can be decoded in an extended system. If so, it continues to step 506. If the entire utterance cannot be decoded in the extended system, the system continues to step 505 which is another decision point. At step 505, the speech recognition system determines whether there is additional biometric/context data available that points to a new word. If so, the speech recognition systems continues to step 520, where user biometric data is interpreted either implicitly or by asking questions. Then at step 509 the vocabulary is updated. If not, the utterance us interpreted by interacting with the user.

One of ordinary skill in the art will understand that the methods depicted and described herein can be embodied in a tangible machine-readable memory medium. A computer program fixed in a machine readable memory medium and embodying a method or methods of the present invention performs steps of the method or methods when executed by a digital processing apparatus coupled to the machine-readable memory medium. Tangible machine-readable memory media include, but are not limited to, hard drives, CD- or DVD-ROM, flash memory storage devices or in a RAM memory of a computer system.

Thus it is seen that the foregoing description has provided by way of exemplary and non-limiting examples a full and informative description of the best method and apparatus presently contemplated by the inventors for implementing a speech recognition system for identifying, and assigning meaning to, new words and utterances initially unknown to the speech recognition system. One skilled in the art will appreciate that the various embodiments described herein can be practiced individually; in combination with one or more other embodiments described herein; or in combination with speech recognition systems differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

We claim:

1. A speech recognition system configured for use with a portable electronic device including telephonic capabilities, the portable electronic device comprising a user interface configured to receive speech from a speaker as input, the speech recognition system comprising:
    at least one processor programmed to:
        determine that the received speech includes an item in an acoustic vocabulary of the speech recognition system, wherein the item is not associated with a valid command construct of an open embedded grammar of the speech recognition system, wherein the open embedded grammar includes a plurality of valid command constructs, each of which includes at least one command word for performing an action on the portable electronic device in combination with one or more words in the acoustic vocabulary of the speech recognition system;
        determine a first confidence score for the item, wherein the first confidence score is determined based, at least in part, on an acoustic score for the item, wherein the acoustic score for the item is determined based, at least in part, on at least a portion of the received speech, wherein the first confidence score is determined based, at least in part, on a language model score for the item, wherein the language model score for the item is determined based, at least in part, on at least a portion of the received speech, and wherein the first confidence score is determined based, at least in part, on a sum of the acoustic score for the item and the language model score for the item;
        determine a second confidence score for at least one word in a valid command construct of the open embedded grammar, wherein the second confidence score is determined based, at least in part, on an acoustic score for the at least one word in the valid command construct, wherein the acoustic score for the at least one word in the valid command construct is determined based, at least in part, on the at least a portion of the received speech, wherein the second confidence score is determined based, at least in part, on a language model score for the at least one word in the valid command construct, wherein the language model score for the at least one word in the valid command construct is determined based, at least in part, on the at least a portion of the received speech, and wherein and the second confidence score is determined based, at least in part, on a sum of the acoustic score for the at least one word in the valid command construct and the language model score for the at least one word in the valid command construct; and
        add a new command construct to the open embedded grammar based, at least in part, on a comparison of the first confidence score and the second confidence score, wherein the new command construct includes the item.

2. The speech recognition system of claim 1, wherein the portable electronic device is a cellular telephone.

3. The speech recognition system of claim 1, wherein the at least one processor is further programmed to:
    prior to adding the new command construct, request confirmation from the speaker that the new command construct corresponds to what the speaker intended, and wherein adding the new command construct is further based, at least in part, on receiving a confirmation from the speaker.

4. The speech recognition system of claim 3, wherein the confirmation comprises confirmation of a spelling of the item and/or confirmation of a pronunciation of the item.

5. The speech recognition system of claim 1, wherein the at least one processor is further programmed to:
    instruct the speaker to illustrate the new command construct by inputting keystrokes, and wherein adding the new command construct is further based, at least in part, on the inputted keystrokes.

6. The speech recognition system of claim 1, wherein the at least one processor is further programmed to:
    detect biometric information identifying that the received speech is associated with the new command construct, and wherein adding the new command construct is further based, at least in part, on the detected biometric information.

7. The speech recognition system of claim 6, wherein the biometric information comprises speech biometric information and/or data derived from video information.

8. The speech recognition system of claim 1, wherein determining that received speech includes an item in an acoustic vocabulary of the speech recognition system comprises determining that the acoustic score for the item is greater than a threshold value.

9. A method for use with a speech recognition system configured for use with a portable electronic device including telephonic capabilities, the portable electronic device comprising a user interface configured to receive speech from a speaker as input, the method comprising:

determining that the received speech includes an item in an acoustic vocabulary of the speech recognition system, wherein the item is not associated with a valid command construct of an open embedded grammar of the speech recognition system, wherein the open embedded grammar includes a plurality of valid command constructs, each of which includes at least one command word for performing an action on the portable electronic device in combination with one or more words in the acoustic vocabulary of the speech recognition system;

determining a first confidence score for the item, wherein the first confidence score is determined based, at least in part, on an acoustic score for the item, wherein the acoustic score for the item is determined based, at least in part, on at least a portion of the received speech, wherein the first confidence score is determined based, at least in part, on a language model score for the item, wherein the language model score for the item is determined based, at least in part, on at least a portion of the received speech, and wherein the first confidence score is determined based, at least in part, on a sum of the acoustic score for the item and the language model score for the item;

determining a second confidence score for at least one word in a valid command construct of the open embedded grammar, wherein the second confidence score is determined based, at least in part, on an acoustic score for the at least one word in the valid command construct, wherein the acoustic score for the at least one word in the valid command construct is determined based, at least in part, on the at least a portion of the received speech, wherein the second confidence score is determined based, at least in part, on a language model score for the at least one word in the valid command construct, wherein the language model score for the at least one word in the valid command construct is determined based, at least in part, on the at least a portion of the received speech, and wherein the second confidence score is determined based, at least in part, on a sum of the acoustic score for the at least one word in the valid command construct and the language model score for the at least one word in the valid command construct; and adding a new command construct to the open embedded grammar based, at least in part, on a comparison of the first confidence score and the second confidence score, wherein the new command construct includes the item.

10. The method of claim 9, wherein the portable electronic device is a cellular telephone.

11. The method of claim 9, further comprising:
prior to adding the new command construct, request confirmation from the speaker that the new command construct corresponds to what the speaker intended, and wherein adding the new command construct is further based, at least in part, on receiving a confirmation from the speaker.

12. The method of claim 11, wherein the confirmation comprises confirmation of a spelling of the item and/or confirmation of a pronunciation of the item.

13. The method of claim 9, further comprising:
instructing the speaker to illustrate the new command construct by inputting keystrokes, and wherein adding the new command construct is further based, at least in part, on the inputted keystrokes.

14. The method of claim 9, further comprising:
detecting biometric information identifying that the received speech is associated with the new command construct, and wherein adding the new command construct is further based, at least in part, on the detected biometric information.

15. The method of claim 6, wherein the biometric information comprises speech biometric information and/or data derived from video information.

16. The method of claim 9, wherein determining that received speech includes an item in an acoustic vocabulary of the speech recognition system comprises determining that the acoustic score for the item is greater than a threshold value.

* * * * *